United States Patent [19]

Schroeder et al.

[11] Patent Number: 5,570,016

[45] Date of Patent: Oct. 29, 1996

[54] METHOD AND APPARATUS FOR DETECTING CRANKSHAFT ANGULAR POSITION

[75] Inventors: Thaddeus Schroeder, Rochester Hills; Bruno P. B. Lequesne, Troy, both of Mich.; Raymond O. Butler, Jr., Anderson, Ind.; Anthony L. Marks, Novi, Mich.; Thomas A. Perry, Washington, Mich.; John R. Bradley, Clarkston, Mich.

[73] Assignee: General Motors Corporation, Detroit, Mich.

[21] Appl. No.: 252,293

[22] Filed: Jun. 1, 1994

[51] Int. Cl.⁶ .............................. G01B 7/14; G01B 7/30; G01B 7/00; F02P 7/067
[52] U.S. Cl. .................. 324/207.25; 324/207.22; 324/207.21
[58] Field of Search ............... 324/207.12, 207.2, 324/207.21, 207.22, 207.25; 123/616, 414

[56] References Cited

U.S. PATENT DOCUMENTS

| | | | |
|---|---|---|---|
| 4,181,884 | 1/1980 | Shirasaki et al. | 324/208 |
| 4,262,526 | 4/1981 | Makita et al. | 73/116 |
| 4,833,405 | 5/1989 | Richards et al. | 324/207.25 |
| 4,866,381 | 9/1989 | Tatsuhiko | 324/208 |
| 4,907,178 | 3/1990 | Ogawa et al. | 364/559 |
| 4,953,531 | 9/1990 | Abe | 123/414 |
| 4,972,332 | 11/1990 | Luebbering et al. | 364/565 |
| 5,070,727 | 12/1991 | Davis et al. | 73/116 |
| 5,097,209 | 3/1992 | Santos | 324/207.22 |
| 5,103,668 | 4/1992 | Drutel et al. | 324/207.22 |
| 5,119,670 | 6/1992 | Whitehorn et al. | 73/116 |
| 5,313,159 | 5/1994 | Allwine, Jr. | 324/207.2 |

OTHER PUBLICATIONS

Lang, "Railroad Car Surveillance" IBM Technical Desclosure Bulletin vol., 4 No. 7 Dec. 1961 p. 32.

*Primary Examiner*—Walter E. Snow
*Attorney, Agent, or Firm*—Timothy G. Gorbatoff

[57] ABSTRACT

A method and apparatus for detecting an engine crankshaft angular position which provides for fast starting of the engine. A target wheel and sensor combination generate an analog signal which is convened into a 24 bit digital output which repeats every 360° rotation of the crankshaft. Each bit represents a particular angular position of the crankshaft. Any 6 sequential bits in the repeating 24 bit digital output sequence form a unique pattern. By monitoring the first six bits generated (90° of crankshaft rotation) during startup, a crankshaft angular position can be determined, thereby enabling fast starting of the engine.

12 Claims, 5 Drawing Sheets

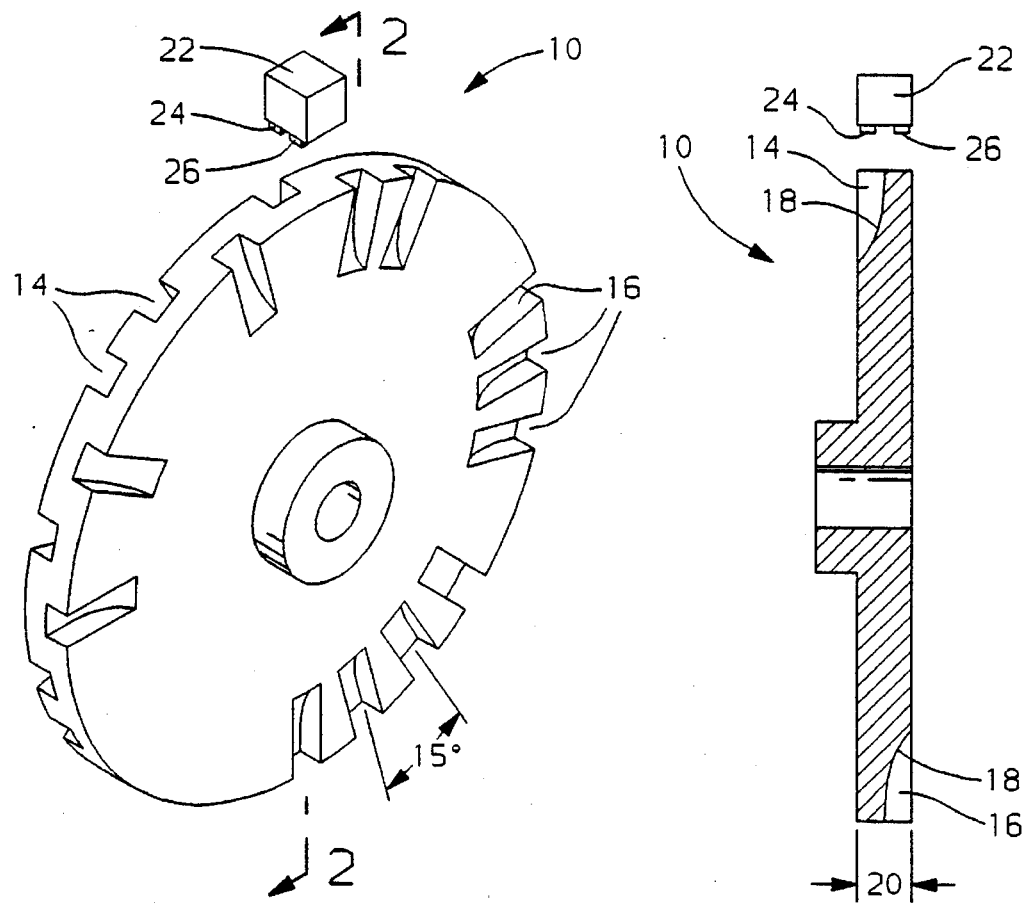
FIG. 1
FIG. 2
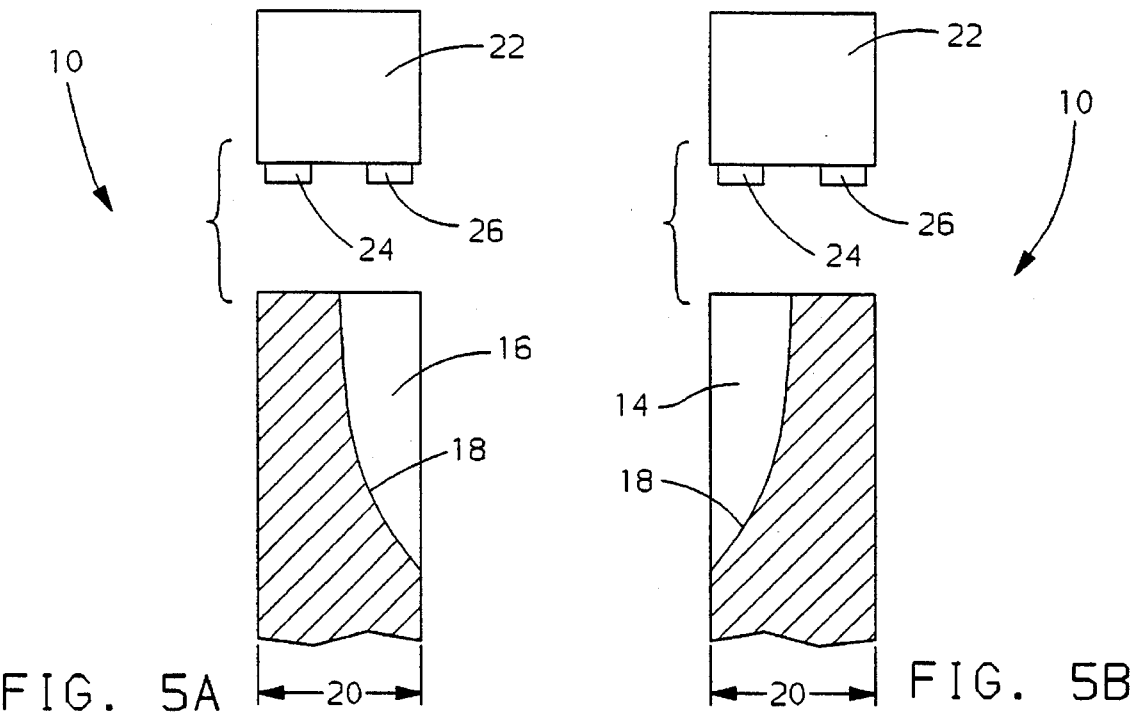
FIG. 5A
FIG. 5B

METHOD AND APPARATUS FOR DETECTING CRANKSHAFT ANGULAR POSITION

This invention relates to a method and apparatus for detecting an engine crankshaft angular position, and more particularly, to a method and apparatus for detecting crankshaft angular position to enable fast starting of the engine.

BACKGROUND OF THE INVENTION

Internal combustion engine distributorless ignition systems utilize a plurality of ignition coils which are energized selectively as a function of engine crankshaft position to fire the correct spark plug. In order to quickly start an engine, the ignition system requires the angular position of the crankshaft within a minimum amount of initial angular rotation of the engine to determine the correct ignition coil to fire.

Typical methods utilize incremental encoders in which the angular position of the crankshaft cannot be determined until a reference mark on a crankshaft mounted target wheel is sensed, identifying a particular absolute crankshaft angular position. This necessitates rotation of the crankshaft by as much as 360°.

SUMMARY OF THE INVENTION

The present invention is directed to a method and apparatus for detecting crankshaft angular position within a minimum amount of crankshaft rotation during start-up, thereby enabling fast starting of the engine.

A target wheel containing elements spaced circumferentially along its periphery is rotated by the engine crankshaft. The rotating elements are detected by an appropriate sensor. The target wheel and sensor combination generate an analog signal which is convened into a sequence of binary values which repeat every 360° rotation of the crankshaft. Each bit in the sequence represents a particular angular position of the crankshaft.

The bit values ("1" and "0") vary as the target wheel is rotated, depending upon the location of the elements on the target wheel. The elements are strategically positioned to provide for a repeatable bit sequence in which the values of any of a predetermined number of sequentially generated bits forms a unique pattern.

By identifying the most recently formed unique pattern in the repeatable bit sequence as represented by the last predetermined number of sequentially generated bits, the present crankshaft angular position can be identified as the angular position associated with the last of the predetermined number of bits.

The predetermined number of bits which form the unique pattern is much less than the number of bits in the repeating sequence so that the crankshaft angular position can be determined within a fraction of a complete 360° crankshaft rotation. By enabling crankshaft angular position detection within only a fraction of crankshaft rotation, fast starting of the engine is therefore possible.

BRIEF DESCRIPTION OF THE DRAWINGS

FIG. 1 illustrates a perspective view of a slotted target wheel in accordance with this invention.

FIG. 2 illustrates a sectional view of the target wheel of FIG. 1.

FIGS. 5A and 5B illustrate the physical orientation of two magnetoresistive sensors with respect to the periphery of the target wheel.

DETAILED DESCRIPTION OF THE PREFERRED EMBODIMENT

Figure 3:
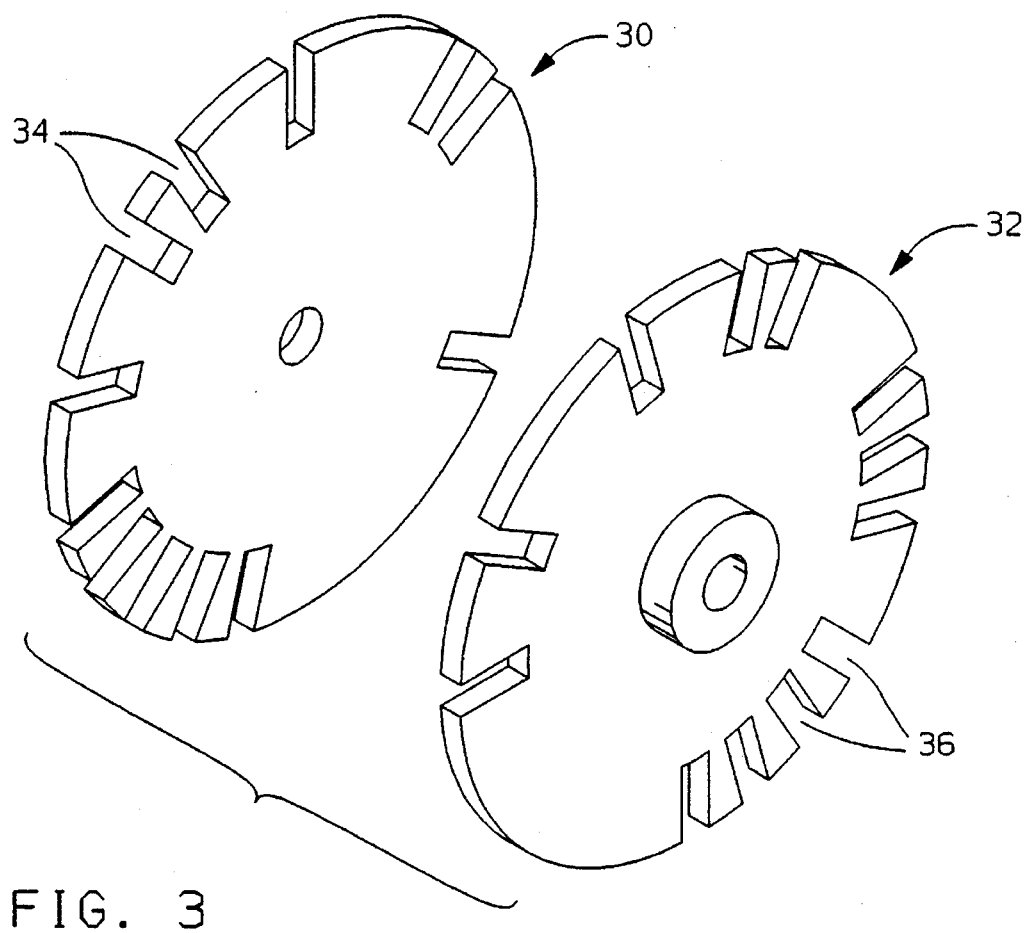
FIG. 3 illustrates an alternative target wheel embodiment having two separate target wheels.

FIG. 1 illustrates a perspective view of a slotted ferromagnetic target wheel 10, constructed in accordance with the present invention, which is rotated by the engine crankshaft (not shown).

The target wheel 10 comprises 24 equally-spaced slots 14 and 16 located along the periphery of the target wheel 10. Each slot is located 15° from each angularly adjacent slot. Twelve of the slots 14 are located within one half of the target wheel 10 while the remaining twelve slots 16 are located within the opposing half of the target wheel 10.

As illustrated by the sectional view of FIG. 2, each slot 14 and 16 extends from the center of the target wheel width to either edge. That is, the slots span only half the thickness 20 of the target wheel 10. Although the slots can be formed square-like, a sloping feature 18 aids in the target wheel manufacturing process.

The target wheel 10 of FIG. 1 can be alternatively formed by joining two individual target wheels 30 and 32, constructed as illustrated in FIG. 3. Target wheel 30 comprises slots 34 extending across its entire thickness, the slots 34 being located along the periphery of target wheel 30 in the same respective angular positions as slots 14 of target wheel 10 in FIG. 1. Similarly, target wheel 32 comprises slots 36 extending across its entire thickness, the slots 36 being located along the periphery of target wheel 32 in the same respective angular positions as slots 16 of target wheel 10 in FIG. 1.

Figure 4:
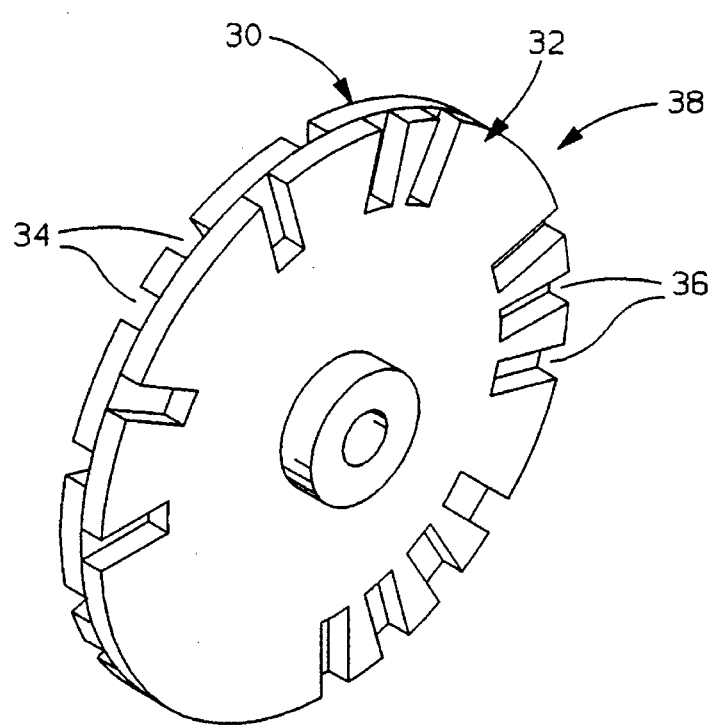
FIG. 4 illustrates the two target wheels of FIG. 3 joined to form the target wheel configuration of FIG. 1.

The two target wheels 30 and 32 can then be aligned and joined, as illustrated in FIG. 4, to form target wheel 38 such that slots 34 and 36 of target wheel 38 are located along the periphery of target wheel 38 in the same respective angular positions as slots 14 and 16 of target wheel 10 in FIG. 1. In some applications, forming the target wheel in this alternative manner provides lower manufacturing costs by allowing for the stamping of the two target wheels 30 and 32 as compared to casting and machining generally required by the target wheel 10 of FIG. 1.

FIGS. 5A and 5B illustrate the physical orientation of two magnetoresistive sensors 24 and 26 in relation to the periphery of the target wheel 10 of FIG. 1. The two sensors 24 and 26 are preferably matched and spaced a certain distance apart on a small biasing magnet 22. The sensors 24 and 26 are located adjacent to respective halves of the target wheel width such that sensor 26 is responsive to the passage of slots 16 located within one half of the target wheel 10 (FIG. 5A), while sensor 24 is responsive to the passage of slots 14 located within the opposing half of the target wheel 10 (FIG. 5B).

Because the slots 14 and 16 only extend halfway across the thickness 20 of the target wheel 10, only the respective sensor 24 and 26 positioned adjacent the half of the target wheel 10 in which the slot is located will be responsive to its passage as the target wheel 10 is rotated.

The resistance of a magnetoresistive sensor varies in the presence of magnetic flux changes. A magnetic flux is developed between the biasing magnet 22 and the target wheel 10. As the target wheel 10 is rotated, slots 14 and 16 pass adjacent the biasing magnet 22. The sudden reduction in ferromagnetic material of the target wheel 10 resulting from the presence of a slot 14 or 16 positioned adjacent the biasing magnet 22 weakens the resultant magnetic flux developed between the biasing magnet 22 and the half of the target wheel 10 in which the slot is located, thereby lowering the resistance of the respective adjacent magnetoresistive sensor 24 or 26. As slots 14 or 16 pass by, the magnetic flux and the resistance of the respective adjacent sensor will gradually increase, renaming to its "no slot" value.

Figure 6:
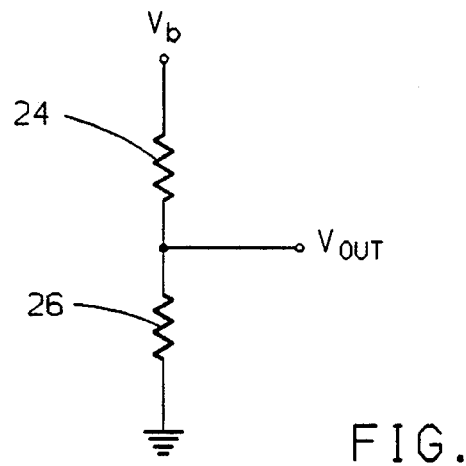
FIG. 6 illustrates a voltage divider circuit for generating an analog signal from two magnetoresistive sensors.

The sensors 24 and 26 are connected in a voltage divider circuit configuration as illustrated in FIG. 6. $V_b$ is a supply voltage with a typical value of +5 $V_{dc}$. $V_{out}$ is the analog signal output of the voltage divider. If sensors 24 and 26 are closely matched, their resistances will be roughly equal when there are no adjacent slots. If such is the case, $V_{out}$ will be approximately $V_b/2$, half the supply voltage.

The value of $V_{out}$ when there are no adjacent slots is called the offset voltage $V_o$. Since the sensors 24 and 26 are located on a single biasing magnet 22, they will remain at virtually the same temperature, making the value of the offset voltage $V_o$ temperature independent.

As a slot 14 passes adjacent to sensor 24 (FIG. 5B), its resistance will lower while the resistance of sensor 26 will remain the same. This will result in a greater percentage of the supply voltage $V_b$ applied across sensor 26, thereby increasing the output voltage $V_{out}$ above the offset voltage $V_o$. Conversely, as a slot 16 passes adjacent to sensor 26 (FIG. 5A), a greater percentage of the supply voltage $V_b$ will be applied across sensor 24, thereby decreasing the output voltage $V_{out}$ below the offset voltage $V_o$.

Figure 7:
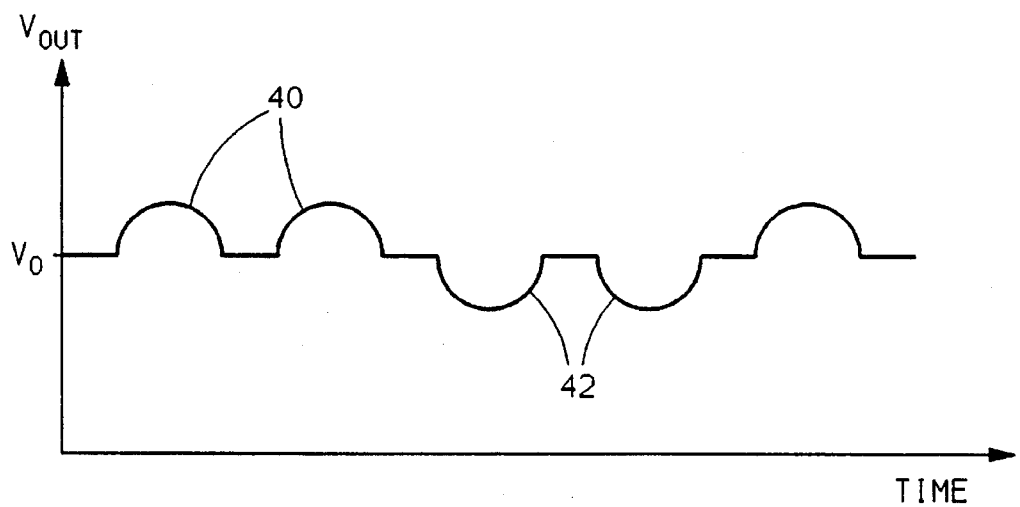
FIG. 7 illustrates the analog signal output of the voltage divider circuit of FIG. 6.

FIG. 7 illustrates the analog signal output of the voltage divider circuit of FIG. 6 as the target wheel 10 of FIG. 1 is rotated. As described above, the output voltage $V_{out}$ increases above the offset voltage $V_o$ as a slot 14 is detected by sensor 24. This condition is designated by reference numeral 40. Conversely, the output voltage $V_{out}$ will decrease below the offset voltage $V_o$ as a slot 16 is detected by sensor 26. This condition is designated by reference numeral 42.

Figure 8:
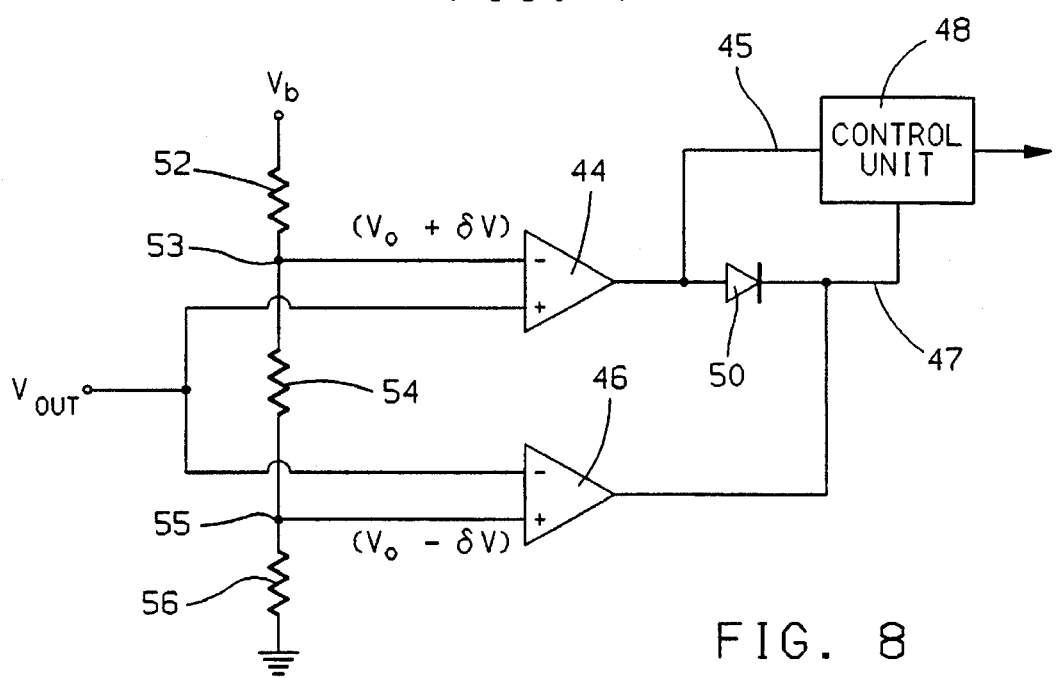
FIG. 8 illustrates an interface circuit for converting the analog signal output of FIG. 7 into a digital output.

The analog signal of FIG. 7 is converted into a digital signal by the interface circuit of FIG. 8. The output voltage signal $V_{out}$ of FIG. 7 is fed into the positive terminal of comparator 44 and the negative terminal of comparator 46. Three resistors 52, 54 and 56 with predetermined ohmic values provide a positive reference voltage ($V_o+\delta V$) at point 53 which is fed into the negative terminal of comparator 44, and a negative reference voltage ($V_o-\delta V$) at point 55 which is fed into the positive terminal of comparator 46. Typical values of $\delta V$ range from 0.1 to 0.2 volts.

Resistors 52 and 56 are selected to have equal ohmic values. The ohmic value of resistor 54 is calculated according to the following formula:

$$R_{54}=[\delta V/(V_b-2\delta V)]/R_{52}$$

The positive and negative reference voltages are used as threshold voltages for slot detection by comparators 44 and 46.

Comparator 44 will have a high voltage output (+5 V) for all values of $V_{out}$ which exceed the positive reference voltage. This will occur when sensor 24 detects the presence of a slot 14.

Comparator 46 will have a high voltage output (+5 V) for all values of $V_{out}$ which fall below the negative reference voltage. This will occur when sensor 26 detects the presence of a slot 16.

Therefore, a high output by comparator 44 represents detection of a slot 14 in one half of the target wheel while a high output by comparator 46 represents detection of a slot 16 in the opposing half of the target wheel.

After the respective slot 14 and 16 passes by adjacent sensors 24 and 26, respectively, the output of comparators 44 and 46, respectively, returns to a low output state (0 V), representing that a slot is no longer being detected by either sensor.

The output of comparator 44 serves as a data signal which is fed into a control unit 48 via signal line 45 for use in determining the angular position of the crankshaft. The angular position of the crankshaft is then used by the engine ignition system to fire the appropriate spark plug.

The output of comparators 44 and 46 are combined via an isolating diode 50 to form clock pulses which are fed into the control unit 48 via signal line 47. The isolating diode 50 performs an OR-ing function by preventing the crossover of high outputs from comparator 46 to the output of comparator 44. By OR-ing 50 the outputs of comparators 44 and 46, a clock pulse is obtained each time a slot 14 or 16 is detected. Since the slots 14 and 16 are equally spaced along the periphery of the target wheel 10, every 15° of crankshaft rotation will result in either sensor 24 or 26 detecting a slot and thereby generating a clock pulse.

FIGS. 9A through 9E illustrate graphs of various signal waveforms occurring within the interface circuit of FIG. 8. When the output of comparator 44 (FIG. 9B) is high in response to $V_{out}$ exceeding the positive reference voltage (FIG. 9A), the high output serves as both the clock pulse (FIG. 9D) and the data signal (FIG. 9E), thereby generating as data an assigned binary value of "1".

Figure 9:
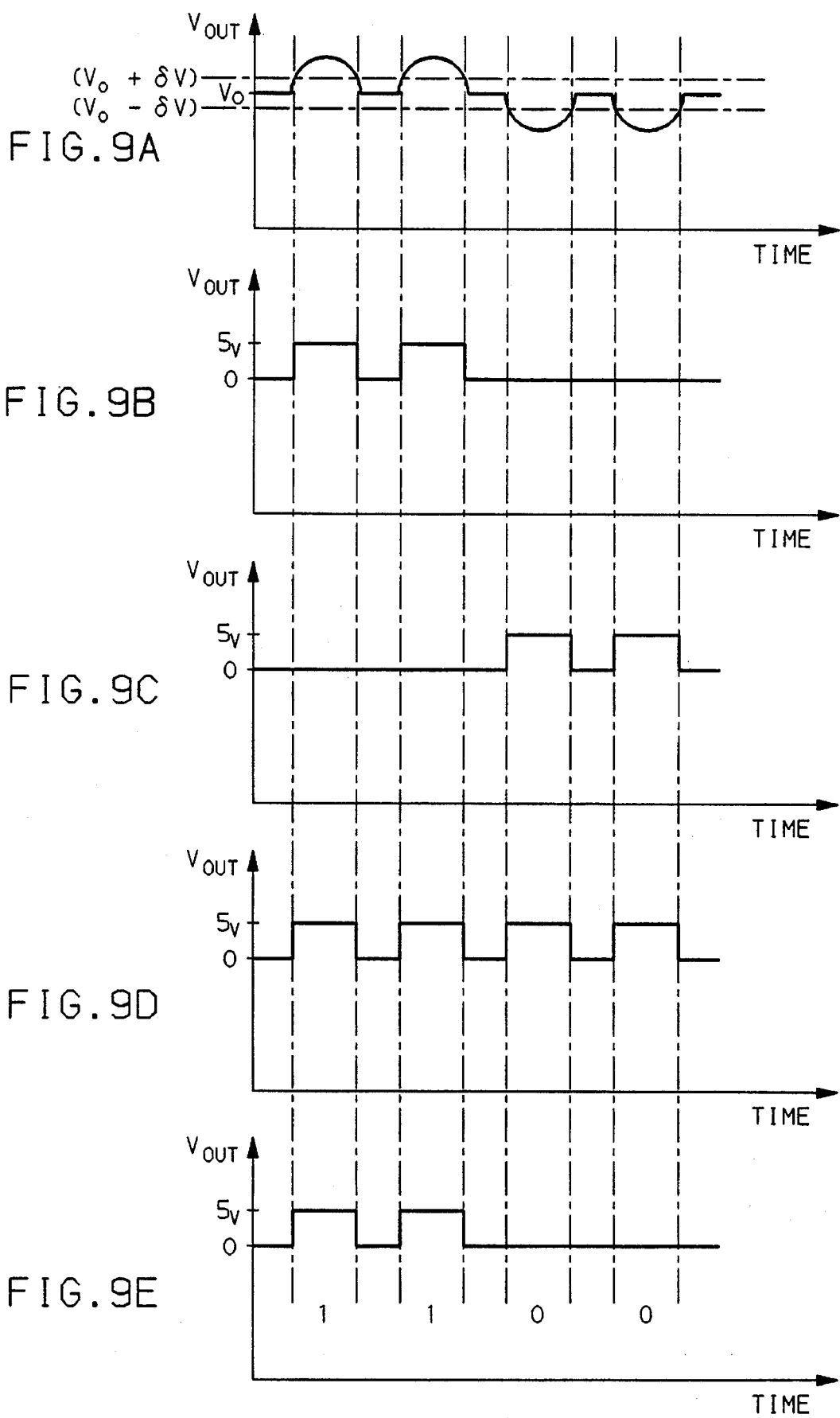
FIGS. 9A through 9E illustrate graphs of various signal waveforms occurring within the interface circuit of FIG. 8.

When the output of comparator 46 is high (FIG. 9C) in response to $V_{out}$ falling below the negative reference voltage (FIG. 9A), the high output serves as the clock pulse (FIG. 9D). The output of comparator 44 (FIG. 9B) still serves as the data signal (FIG. 9E), generating as data an assigned binary value of "0".

If the value of $V_{out}$ (FIG. 9A) neither exceeds the positive reference voltage nor falls below the negative reference voltage, the output of both comparators 44 (FIG. 9B) and 46 (FIG. 9C) will be low, representing that no slot is being detected.

The slots 14 and 16 are strategically positioned on the target wheel 10 of FIG. 1 to produce the data bit sequence illustrated in the table below:

| Slot # | Bit Value | Crankshaft Angular Rotation |
|---|---|---|
| 1 | 0 | 0°/360° |
| 2 | 0 | 15° |
| 3 | 0 | 30° |
| 4 | 0 | 45° |
| 5 | 0 | 60° |
| 6 | 1 | 75° |
| 7 | 1 | 90° |
| 8 | 1 | 105° |
| 9 | 1 | 120° |
| 10 | 1 | 135° |
| 11 | 0 | 150° |
| 12 | 1 | 165° |
| 13 | 1 | 180° |
| 14 | 1 | 195° |
| 15 | 0 | 210° |
| 16 | 0 | 225° |
| 17 | 1 | 240° |
| 18 | 1 | 255° |
| 19 | 0 | 270° |
| 20 | 0 | 285° |
| 21 | 0 | 300° |
| 22 | 1 | 315° |
| 23 | 0 | 330° |
| 24 | 1 | 345° |

Every 360° rotation of the target wheel 10, corresponding to a 360° rotation of the engine crankshaft, results in a repeating 24 bit sequence. Each bit corresponds to a slot on the target wheel 10, which in turn is associated with a particular angular position of the crankshaft. Each slot 14 located within one-half of the target wheel 10 corresponds to a bit value of "1", while each slot 16 located in the opposing half of the target wheel 10 corresponds to a bit value of "0". The angular position associated with each bit are in 15° intervals (degree of resolution).

The 24 bit sequence generated in a 360° rotation of the engine crankshaft is such that the values of any six sequential bits form a unique six bit pattern. The last of each six sequential bits is associated with a unique angular position of the crankshaft. With 24 bits per crankshaft revolution, there are 24 such unique six bit patterns per crankshaft revolution, each representing a unique angular position of the crankshaft.

The 24 bit sequence and the crankshaft angular position associated with each six bit pattern are stored in the memory of the control unit 48. For example, the bit sequence generated from the $13^{th}$ to the $18^{th}$ slot is [1,1,0,0,1,1]. This pattern does not repeat anywhere in the 24 bit sequence and represents a unique angular position (255°) of the crankshaft associated with the last of the six bit sequence.

The bits are received by the control unit 48 of FIG. 8 which locates the most recent six bit pattern in the 24 bit sequence stored in memory. Once located, the control unit 48 identifies the present crankshaft angular position as the angular position associated with the last bit of the unique six bit pattern.

For example, using the sample sequence above, if the most recent six bits sequentially generated were [1,1,0,0,1,1], the last bit would correspond to an angular position of 255°. In this way, during a start-up, the control unit can identify the angular position of the crankshaft within the first 90° of crankshaft rotation (6 bits @15°/bit). This allows for rapid identification of the correct ignition coil to discharge, thereby enabling a fast start of the engine.

The crankshaft position is thereafter determined with each new bit generated. By combining each new bit generated with the previous five generated, a new six bit pattern is formed and the control unit 48 can update the crankshaft angular position.

The number of bits required to form a unique pattern for a specified number of angular position intervals is governed by the following equation:

$$\#bits = \log_2(\#angular\ position\ intervals)$$

The preferred embodiment of this invention has 24 angular position intervals. Therefore, a minimum of five bits are required to form unique, non-repeating patterns within the 24 bit repeating sequence. A minimum of six bits are required for 48 angular positions intervals. In the preferred embodiment, six bits were chosen as a standardization scheme for both 24 and 48 angular position interval ignition schemes.

Figure 10:
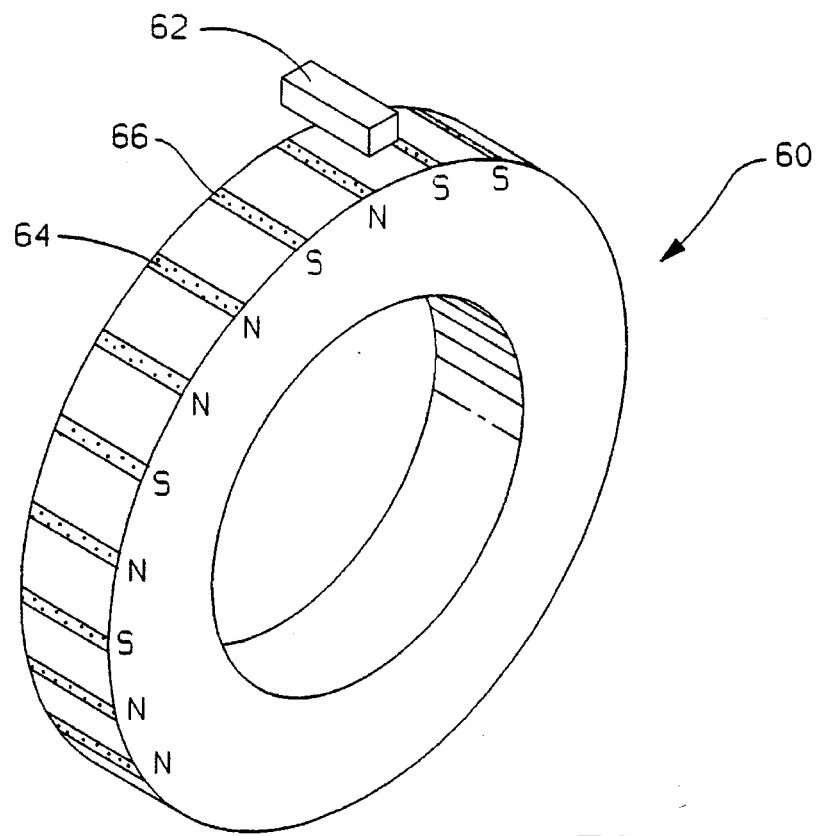
FIG. 10 illustrates a first alternative embodiment having a target wheel with a single magnetized track.

FIG. 10 illustrates a first alternative embodiment in which the apparatus comprises a permanent magnet target wheel 60 and a single Hall sensor 62. The target wheel is magnetized with an appropriate pattern of properly spaced magnetic regions of varying polarity (N and S). This can be done either by conventional magnetizing or with known laser imprinting methods.

The sensor 62 is located adjacent to the periphery of the target wheel 60 and detects not only the presence of the rotating magnetic regions, but their polarity as well. The output of the sensor 62 is similar to the analog signal illustrated in FIG. 7. However, in this embodiment, regions of one polarity (N) generate output voltages $V_{out}$ greater than the offset voltage $V_o$ (equal to the output voltage $V_{out}$ in the absence of a magnetized region adjacent to the sensor 62) while regions of the opposing polarity (S) generate output voltages $V_{out}$ less than the offset voltage $V_o$.

The polarities of the magnetic regions are strategically arranged along the circumference of the target wheel 60 such that regions of N polarity are located angularly in respect to the location of slots 14 of the target wheel 10 in FIG. 1, while regions of S polarity are located angularly in respect to the location of slots 16 of the target wheel 10 in FIG. 1.

Figure 11:
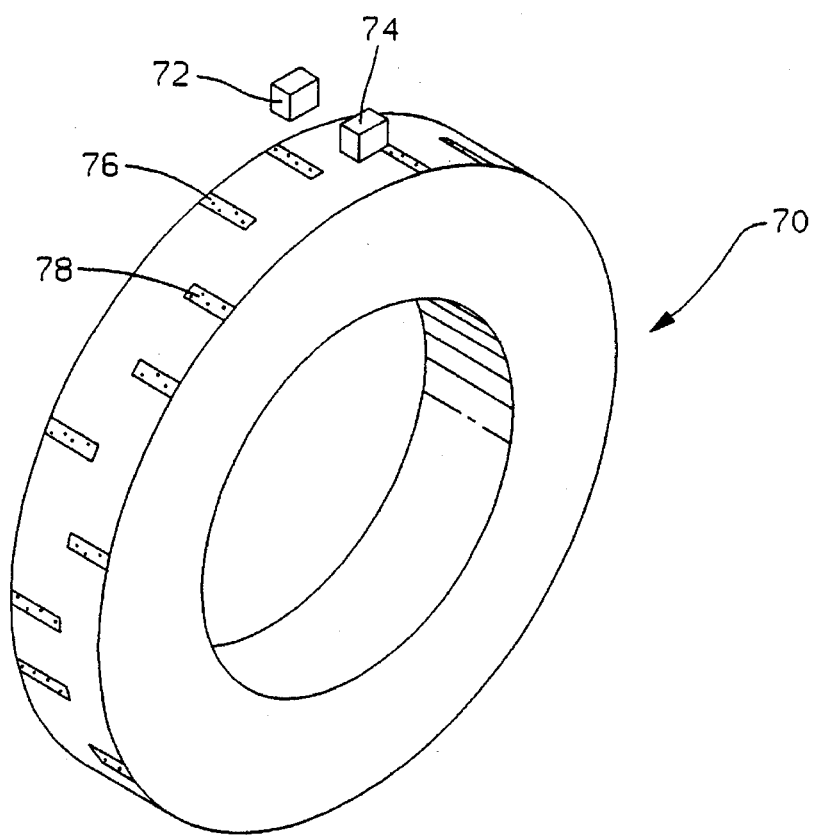
FIG. 11 illustrates a second alternative embodiment having a target wheel with two magnetized tracks.

FIG. 11 illustrates a second alternative embodiment in which the apparatus comprises a permanent magnet target wheel 70 and two magnetoresistive or Hall sensors 72 and 74. Each half of the target wheel is magnetized with an appropriate pattern of properly spaced magnetic regions of either similar or varying polarity, the magnetized pattern being identical to the pattern of slots 14 and 16 on the target wheel 10 of FIG. 1. This can be done either by conventional magnetizing or with known laser imprinting methods.

Each sensor 72 and 74 is located adjacent to a respective half of the target wheel 70, responsive only to the presence of magnetic regions located within the respective half of the target wheel adjacent to which the sensor is located. The output of sensors 72 and 74 will be similar to the analog signals illustrated in FIG. 7. However, in this embodiment, magnetic regions located in one half of the target wheel will generate output voltages $V_{out}$ greater than the offset voltage $V_o$ (equal to the output voltage $V_{out}$ in the absence of a magnetized region adjacent to the sensors), while magnetic regions located in the opposing half of the target wheel will generate output voltages $V_{out}$ less than the offset voltage $V_o$.

While the present invention has been described in reference to the illustrated embodiments, it will be recognized that various modifications will occur to those skilled in the art. In this regard, it will be understood that such modifications may fall within the scope of this invention, which is defined by the appended claims.

The embodiments of this invention in which an exclusive property or privilege is claimed are defined as follows:

1. An angular position detection apparatus, comprising:
    a target wheel rotatable about an axis, the target wheel having a total number of elements angularly spaced along its periphery, the total number of elements comprising a first set of elements and a second set of elements wherein the second set of elements are located at different angular positions as the first set of elements;

a first sensor positioned adjacent to the target wheel periphery and responsive to passage of each of the first set of elements adjacent the first sensor as the target wheel is rotated;

a second sensor positioned adjacent to the target wheel periphery and responsive to passage of each of the second set of elements adjacent the second sensor as the target wheel is rotated; and means for generating a repeatable set of n binary values for each complete rotation of the target wheel, a first binary value corresponding to passage of each of the first set of elements adjacent the first sensor and a second binary value corresponding to passage of each of the second set of elements adjacent the second sensor, each binary value and the preceding m binary values comprising a unique sequence of m+1 binary values where m+1 is less than n, each unique sequence of m+1 binary values corresponding to a unique, predetermined angular position of the target wheel.

2. The angular position detection apparatus according to claim 1, wherein n is equal to twenty-four and m is equal to five.

3. The angular position detection apparatus according to claim 1, the target wheel further comprising a first half and a second half wherein the first set of elements are located in the first half of the target wheel and the second set of elements are located in the second half of the target wheel.

4. The angular position detection apparatus according to claim 3, wherein the first sensor is positioned adjacent the first half of the target wheel and the second sensor is positioned adjacent the second half of the target wheel.

5. An angular position detection apparatus, comprising:

a target wheel rotatable about an axis, the target wheel having a total number of magnetic regions angularly spaced along its periphery, each of the magnetic regions being one of a first and second polarity;

a sensor positioned adjacent to the target wheel periphery and responsive to passage of each of the magnetic regions of the first and second polarity as the target wheel is rotated; and means for generating a repeatable set of n binary values for each complete rotation of the target wheel, a first binary value corresponding to passage of each magnetic region of the first polarity and a second binary value corresponding to passage of each magnetic region of the second polarity, each binary value and the preceding m binary values comprising a unique sequence of m+1 binary values where m+1 is less than n, each unique sequence of m+1 binary values corresponding to a unique, predetermined angular position of the target wheel.

6. The angular position detection apparatus according to claim 5, wherein n is equal to twenty-four and m is equal to five.

7. An angular position detection apparatus, comprising:

a target wheel rotatable about an axis, the target wheel having a total number of magnetic regions angularly spaced along its periphery, the total number of magnetic regions being comprised of a first and second set of magnetic regions wherein the second set of magnetic regions are located at different angular positions as the first set of magnetic regions;

a first sensor positioned adjacent to the target wheel periphery and responsive to passage of each of the first set of magnetic regions adjacent the first sensor as the target wheel is rotated;

a second sensor positioned adjacent to the target wheel periphery and responsive to passage of each of the second set of magnetic regions adjacent the second sensor as the target wheel is rotated; and means for generating a repeatable set of n binary values for each complete rotation of the target wheel, a first binary value corresponding to passage of each of the first set of magnetic regions adjacent the first sensor and a second binary value corresponding to passage of each of the second set of magnetic regions adjacent the second sensor, each binary value and the preceding m binary values comprising a unique sequence of m+1 binary values where m+1 is less than n, each unique sequence of m+1 binary values corresponding to a unique, predetermined angular position of the target wheel.

8. The angular position detection apparatus according to claim 7, wherein n is equal to twenty-four and m is equal to five.

9. The angular position detection apparatus according to claim 7, the target wheel further comprising a first half and a second half wherein the first set of magnetic regions are located in the first half of the target wheel and the second set of magnetic regions are located in the second half of the target wheel.

10. The angular position detection apparatus according to claim 9, wherein the first sensor is positioned adjacent the first half of the target wheel and the second sensor is positioned adjacent the second half of the target wheel.

11. A method for detecting the angular position of a rotary object, comprising:

generating a repeatable set of n binary values for each complete rotation of the rotary object wherein each binary value and the preceding m binary values comprise a unique sequence of binary values where m+1 is less than n;

assigning to each of the binary values in the repeatable set of n binary values a unique angular position of the rotary object;

identifying the most recent binary value and the preceding m binary values, thereby identifying the unique sequence of m+1 binary values ending with the most recent binary value;

locating the unique sequence of m+1 binary values ending with the most recent binary value in the repeatable set of n binary values; and identifying the angular position of the rotary object as the angular position assigned to the most recent binary value.

12. The method for detecting the angular position of a rotary object according to claim 11, wherein n is equal to twenty-four and m is equal to five.

* * * * *